United States Patent [19]
Walters

[11] Patent Number: 5,713,714
[45] Date of Patent: Feb. 3, 1998

[54] TILT CYLINDER FOR AN UNDERREACH ASSEMBLY

[75] Inventor: Donald E. Walters, Channelview, Tex.

[73] Assignee: Jerr-Dan Corporation, Greencastle, Pa.

[21] Appl. No.: 555,211

[22] Filed: Nov. 8, 1995

[51] Int. Cl.⁶ ................................................. B60P 3/12
[52] U.S. Cl. ..................... 414/563; 280/402; 414/742; 414/546
[58] Field of Search ..................... 414/563, 546, 414/698, 728, 742, 426, 428; 280/402; 254/2 R, 3 R

[56] References Cited

U.S. PATENT DOCUMENTS

| | | | |
|---|---|---|---|
| 4,534,579 | 8/1985 | Shackelford, Sr. | 414/563 X |
| 4,634,337 | 1/1987 | Hamman | 280/402 X |
| 4,637,623 | 1/1987 | Bubik | 280/402 |
| 4,666,364 | 5/1987 | Doege et al. | 414/742 |
| 5,350,271 | 9/1994 | Weller | 414/563 |

FOREIGN PATENT DOCUMENTS

| | | | |
|---|---|---|---|
| 2690883 | 11/1993 | France | 414/563 |
| 438044 | 6/1967 | Switzerland | 280/402 |

OTHER PUBLICATIONS

Vulcan Model 30.25, Street Legal . . . from New York to L.A., p. 1 (undated).

*Primary Examiner*—Frank E. Werner
*Attorney, Agent, or Firm*—McDermott, Will & Emery

[57] ABSTRACT

The present invention is directed a tilt cylinder assembly for an underlift assembly for attachment to a recovery vehicle. The present invention provides for rotation of the horizontal member about a first and second pivot point. The first pivot point is where the lifters attach to the horizontal member. The second pivot point is formed by attaching a forward end of the horizontal member to a tilt cylinder assembly including at least one lifter. The tilt cylinder assembly lifter provides for movement of the second pivot point. By providing two pivot points, the operator of the underlift assembly is allowed more flexibility in positioning.

21 Claims, 8 Drawing Sheets

TILT CYLINDER FOR AN UNDERREACH ASSEMBLY

BACKGROUND OF THE INVENTION

This invention relates to a tilt cylinder assembly for an underreach assembly for a recovery or towing vehicle.

In order to tow a truck and other large disabled vehicle, the lifting boom of the underreach assembly is used to engage the underframe of the vehicle. Since the disabled vehicle might weigh 60,000 lbs or more, it is important that the underreach assembly properly engages the underframe so that the disabled vehicle is secured to the recovery vehicle and so that the disabled vehicle is not damaged by the underreach assembly. In order to ensure that the underreach assembly couples the underframe of the disabled vehicle at the right position, the recovery vehicle operator has to carefully position the underreach assembly relative to the disabled vehicle's underframe to properly engage the underreach assembly with the underframe of the disabled vehicle. If the lifting boom of the underreach assembly is not properly positioned under the underframe, the operator has no assurance that the disabled vehicle will be positively coupled to the recovery vehicle. In addition, the underreach assembly may damage the disabled vehicle if the underframe is not engaged in the proper position. Proper positioning is especially difficult when there is very little room between the underframe and the ground or when the disabled vehicle is resting on uneven terrain. To prevent such problems, it would be very advantageous for the recovery vehicle operator to have as much flexibility as possible in positioning the underreach assembly relative to the underframe of the disabled vehicle.

Figure 1:
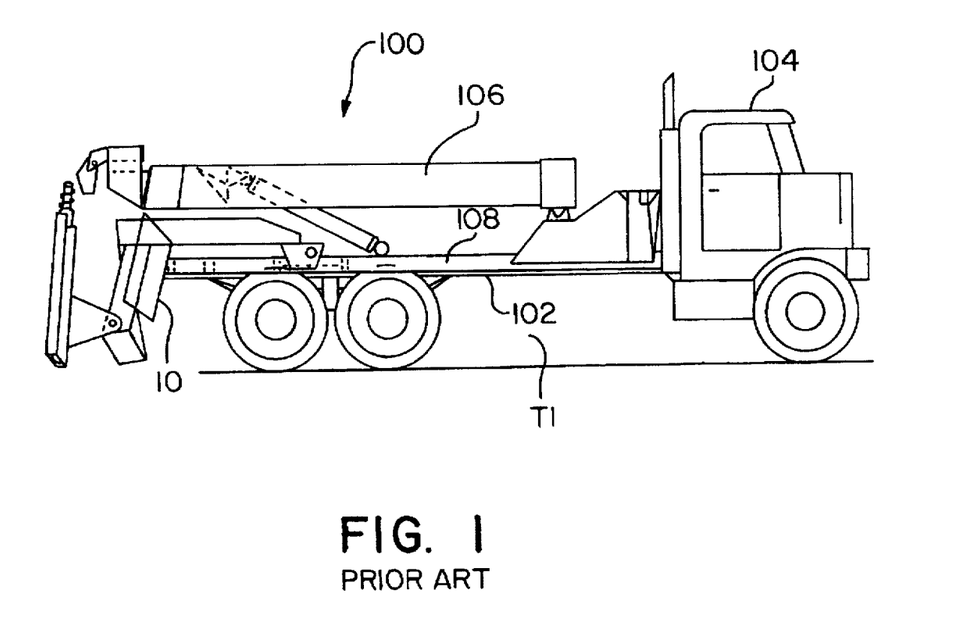
FIG. 1 is a side view of a recovery vehicle having a prior art underreach assembly.

Various forms of equipment have been provided for attaching the underreach assemblies of recovery vehicles to disabled vehicles in a correct manner and with a view toward minimizing the likelihood of damage to a towed vehicle. As shown in FIG. 1, a recovery vehicle 100 typically comprises a truck chassis 102 having a cab 104 for operator control and a main crane boom 106 positioned on the rear portion 108 of the truck chassis 102. An underreach assembly 10 is attached to the rear most portion of the truck chassis 102.

Figure 2:
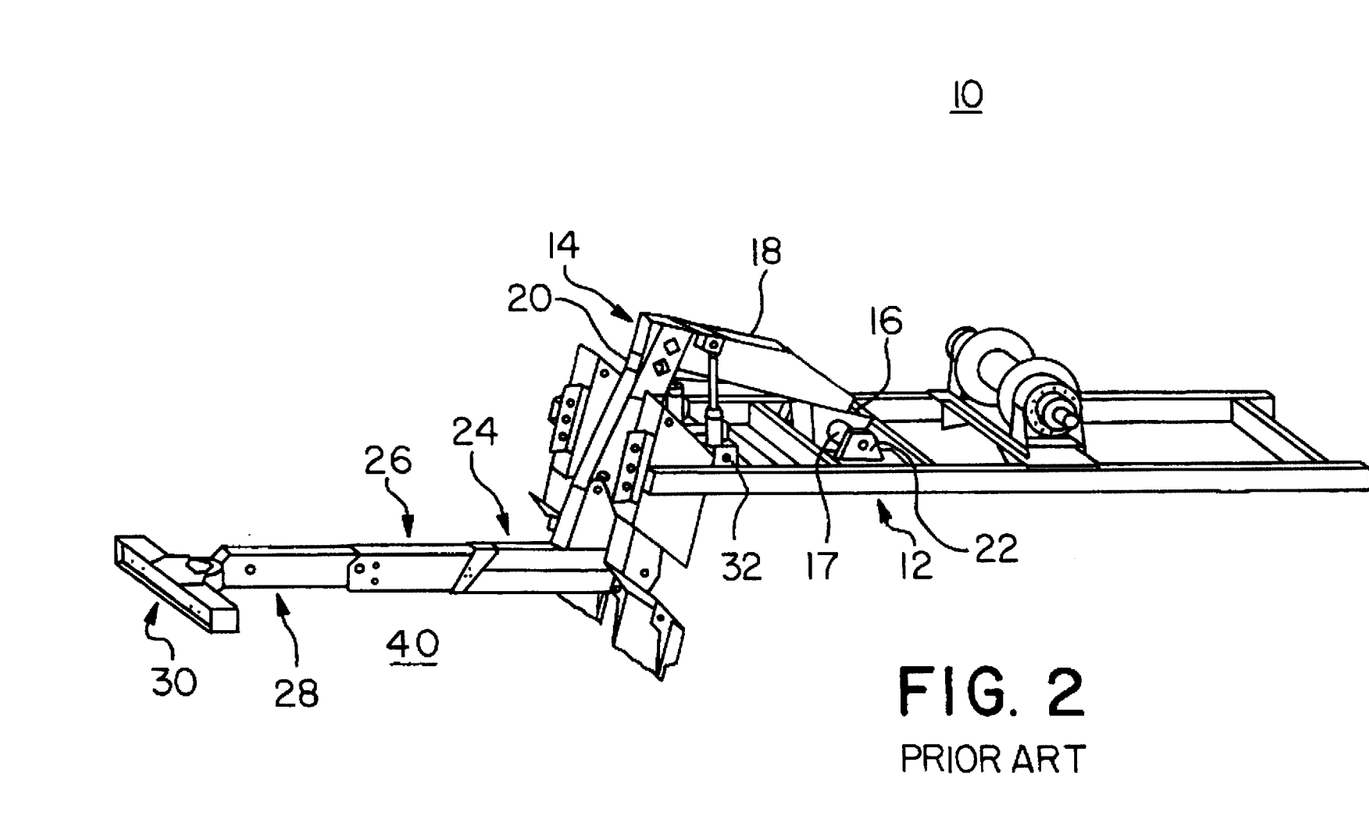
FIG. 2 is a perspective view of a prior art underreach assembly.

Turning now to FIG. 2, in the prior art towing apparatus an underreach assembly 10 has a subframe 12 which is attached to the back of a recovery vehicle 100 in a manner well known to those skilled in the art. Attached to the subframe 12 is an underreach boom base 14, which comprises a pivot assembly 16, a horizontal member 18, and a vertical member 20. The pivot assembly 16 comprises a main pivot 17, which is rotatably attached to a pivot member 22 that is mounted on the subframe 12. The horizontal member 18 is fixed to the pivot assembly 16 at one end and to one end of the vertical member 20 at its other end. At the opposite end of the vertical member 20 is attached a lifting boom having three stages. Lifting boom stages 1–3, shown as elements 24, 26, and 28 respectively, are made to slidably extend under a disabled vehicle so that a lifting bar 30, fixably attached to the end of lifting boom third stage 28, is properly positioned under the disabled vehicle. The lifting bar 30 conventionally includes a pair of yokes 38 (FIG. 4) for receiving some member of the underframe of the disabled vehicle in the crotch of the yokes. The lifting boom stages 1–3 and lifting bar 30 are shown in the retracted position and upright position in FIG. 1 when the recovery vehicle is not towing another vehicle, and in the operating position in FIG. 2.

Figure 3:
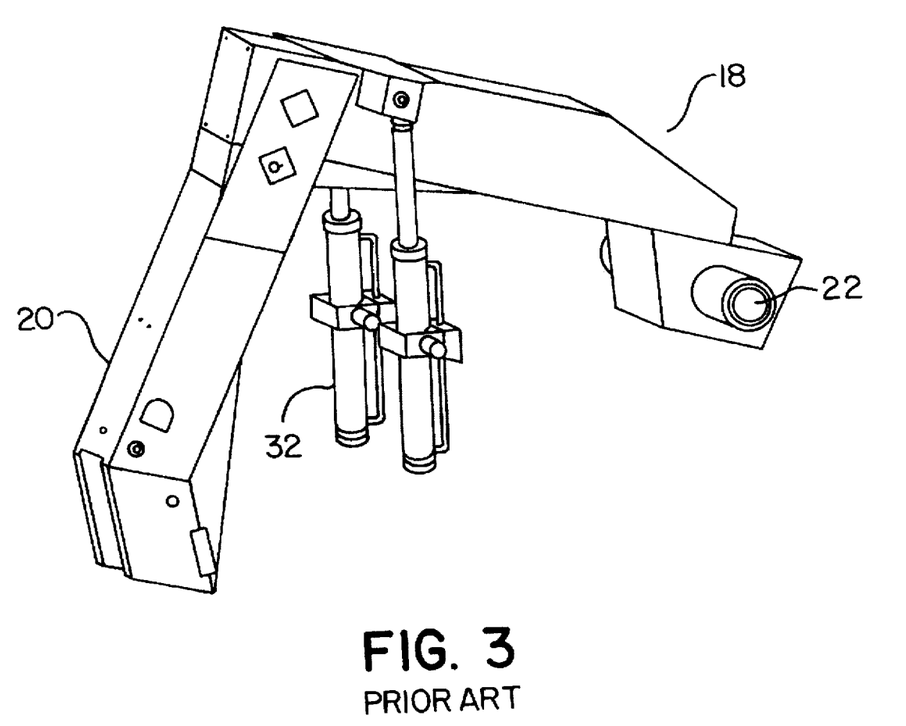
FIG. 3 is a detailed perspective view of the horizontal and vertical members of the underreach assembly of FIG. 2.
Figure 4:
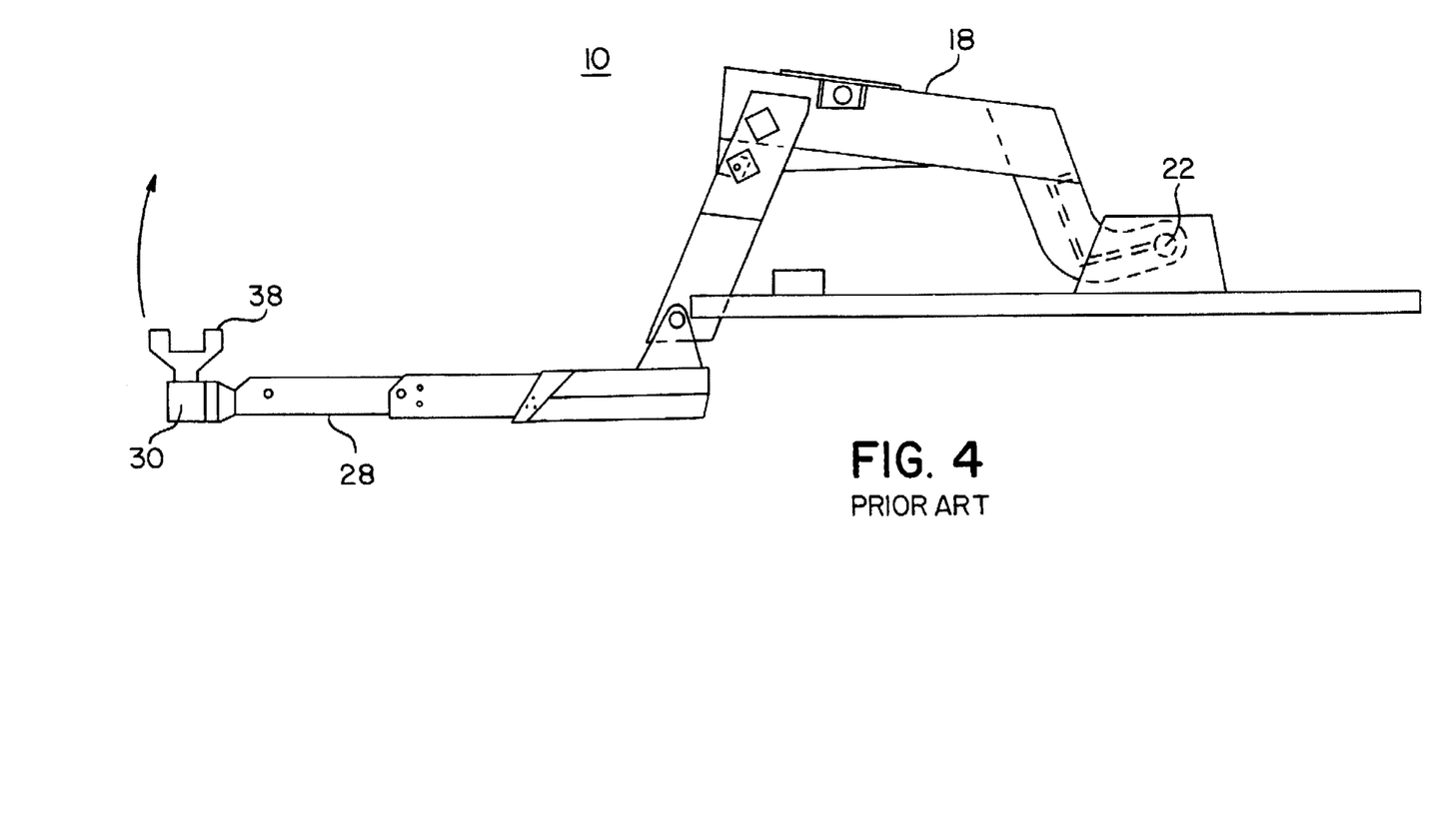
FIG. 4 is a side view of a prior art underreach assembly showing the arc of travel.

With reference to FIG. 4, once the lifting bar 30 is positioned under the disabled vehicle, a set of hydraulic cylinders or vertical actuators called "lifters" 32 (FIG. 3) on the underreach assembly 10 are operated such that the entire underreach assembly 10 is raised and the lifting bar 30 contacts the underframe of the disabled vehicle. In order to accomplish the engagement of the yokes 38 on the lifting bar 30 with the underframe of the vehicle, the horizontal member 18 is lifted vertically by lifters 32. As the horizontal member 18 is raised and the entire underreach assembly is rotated around the main pivot 22. Therefore, as the assembly 10 is lifted, the entire underreach assembly 10 moves upward in an arc toward the underframe of the disabled vehicle.

As shown in FIG. 4, the lifters 32 push the rear end of the horizontal member upward and cause the entire assembly to pivot about main pivot 22. Thus, as the lifters 32 raise the underreach assembly 10, the assembly 10 moves in an arc as opposed to a straight up or entirely in a vertical direction. Depending on the length of the underreach assembly, the arc can be very pronounced.

The presence of this arc, such as shown in FIG. 4, makes it difficult for the recovery vehicle operator to estimate where the lifting bar 30 will contact the underframe. The recovery vehicle operator must guess how great or small the arc will be based on the slope of the terrain on which the two vehicles are sitting. Therefore, the operator must not only estimate whether the recovery vehicle is properly positioned for extension of the underreach, but must also compensate for the arc created as the underreach is lifted to engage the underframe of the disabled vehicle. In addition, in situations where there is not much clearance between the underreach 30 and the underframe, there exists the likelihood that the underreach will damage the disabled vehicle when the assembly 10 is lifted.

The prior art teaches and discloses a recovery vehicle having an underreach assembly in which the entire assembly moves about a main pivot point in order to engage the underreach assembly with the underframe of the disabled vehicle. The prior art does not provide the important advantage of an underreach assembly that moves about different pivot points so that the contact point of the underreach assembly to the underframe of the disabled vehicle can be predicted with certainty no matter the slope of the terrain. Further, the prior art does not provide the advantage of a smaller lifting cylinder that will achieve the same lifting power as the dual lifting cylinders of the prior art.

SUMMARY OF THE INVENTION

Accordingly, it is the object of this invention to provide improved and more easily operated lifting and towing equipment which affords easier and more efficient operation in close quarters and sloping terrain. The present invention provides for rotation of the horizontal member about a first and second pivot point. The first pivot point is where the lifters attach to the horizontal member. The second pivot point is formed by attaching a forward end of the horizontal member to a tilt cylinder assembly including at least one lifter. The tilt cylinder assembly lifter provides for movement of the second pivot point.

It is another object of this invention to provide increased lifting power to lift very heavy loads using the tilt cylinder assembly lifter. In accordance with the invention, an underreach assembly comprises a tilt cylinder having a track for guiding the motion of the second pivot point. The tilt cylinder assembly lifter moves the second pivot point along the track. The tilt cylinder assembly in a preferred embodiment has a guide member attached to the second pivot point with at least one roller, preferably two, allowing the guide member to move along the track. In the preferred embodiment the track is channel shaped and provides for vertical movement of the second pivot point. The track in an alternative embodiment may have a curved surface.

One method of operation that is envisioned is for the operator to position the lifting boom to near engagement with the vehicle to be lifted and towed, using the lifters. The vehicle is then engaged and lifted by using the tilt cylinder assembly lifter to force the forward end of the horizontal member down pivoting underreach assembly about the first pivot point raising the lifting boom. This provides increased lifting power and reduces the arc of motion of the engaging end of the lifting boom.

DETAILED DESCRIPTION OF THE PREFERRED EMBODIMENT

As shown in FIG. 1, a recovery vehicle 100 typically comprises a truck chassis 102 having a cab 104 for operator control and a main crane boom 106 positioned on the rear portion 108 of the truck chassis 102. An underreach assembly 50, as shown in FIG. 5 is attached to the rear most portion of the truck chassis 102.

Figure 5:
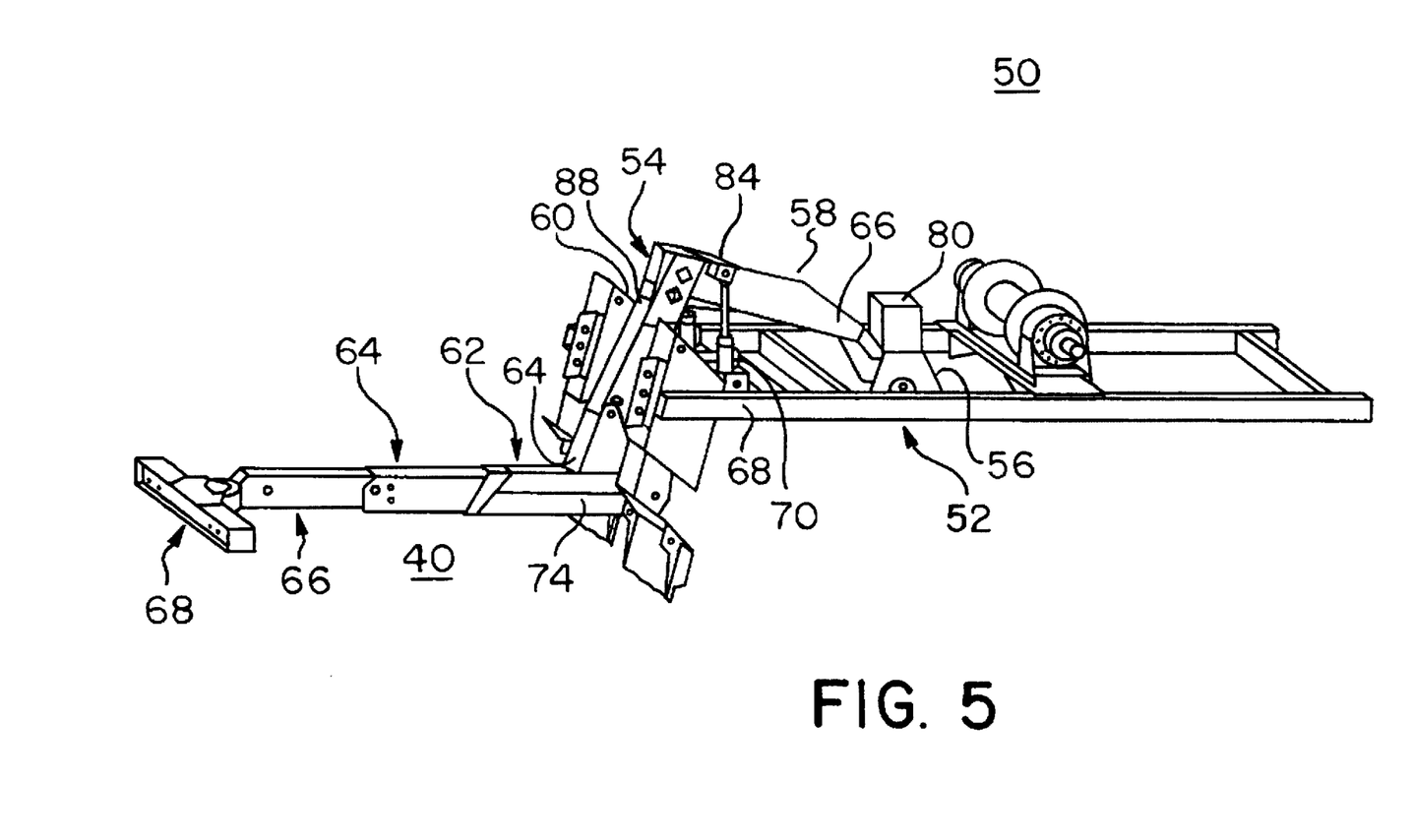
FIG. 5 is a perspective view of the underreach assembly of this invention.

Turning now to FIG. 5, an underreach assembly 50 has a subframe 52 which is attached to the back of a chassis of a recovery vehicle 100 in a manner well known to those skilled in the art. Attached to the subframe 52 is an underreach boom base 54 which is comprised of a tilt cylinder assembly 56, a horizontal member 58, and a vertical member 60. The horizontal member 58 is fixed to the tilt cylinder assembly 56 at a front end 66 and to one end 88 of the vertical member 60 at its other end. At the opposite end of the vertical member 60 is attached a lifting boom 40 having three lifting boom stages. Lifting boom stages 1-3, shown as elements 62, 64, and 66 respectively, are made to slidably extend under a disabled vehicle so that a lifting bar 68 fixably attached to the end of underreach third stage 66 is properly positioned under the disabled vehicle. The lifting boom stages 1-3 and lifting bar 68 are shown in the operating position in FIG. 5.

Once the lifting bar 68 is positioned under the disabled vehicle, the tilt cylinder assembly is operated such that the entire underreach assembly 50 is pivoted about the first pivot point 84 and the lifting bar 68 engages the underframe of the disabled vehicle. As described in greater detail below, in order to accomplish the engaging of the lifting bar 68 with the underframe of the vehicle, the rear portion of horizontal member 58 is lowered by the tilt cylinder assembly 56. Once the tilt cylinder assembly 56 is lowered, a pair of lifters 70 then operate to lift the front portion of first horizontal member 58 so that the underreach assembly nearly engages the underframe of the disabled vehicle. Movement of the lifters 70 and the tilt cylinder assembly lifter can be incrementally moved until the lifting bar contacts the underframe of a disabled vehicle.

Figure 6:
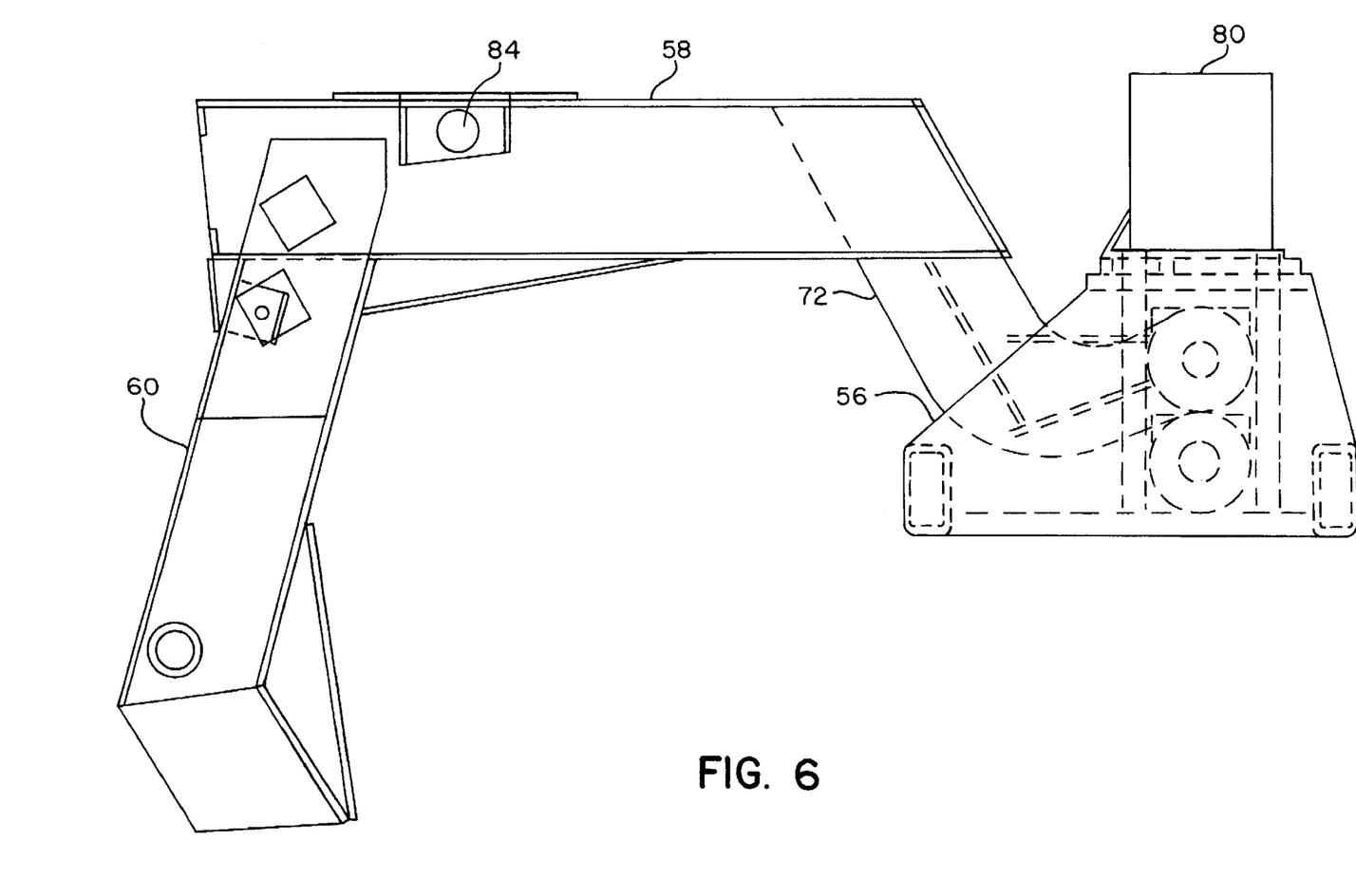
FIG. 6 is a partial side view of an underreach assembly in accordance with the preferred embodiment of this invention.
Figure 7:
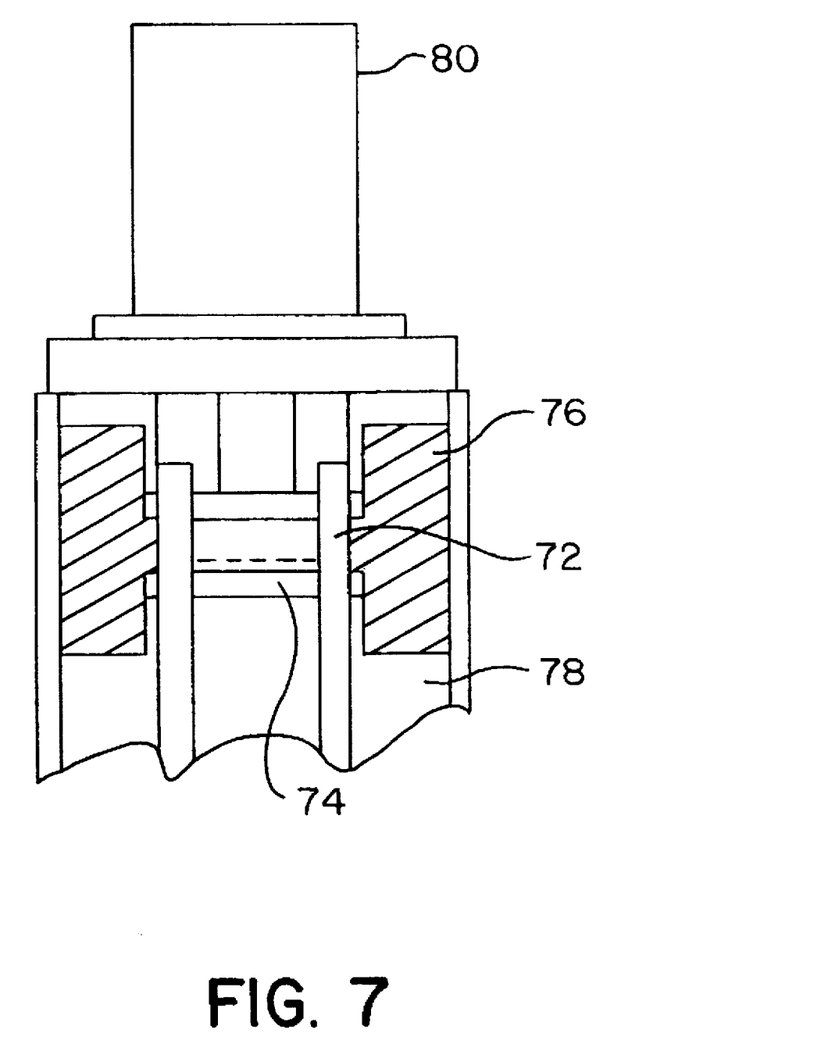
FIG. 7 is a rear view of the tilt cylinder of the underreach assembly of FIG. 5.
Figure 8:
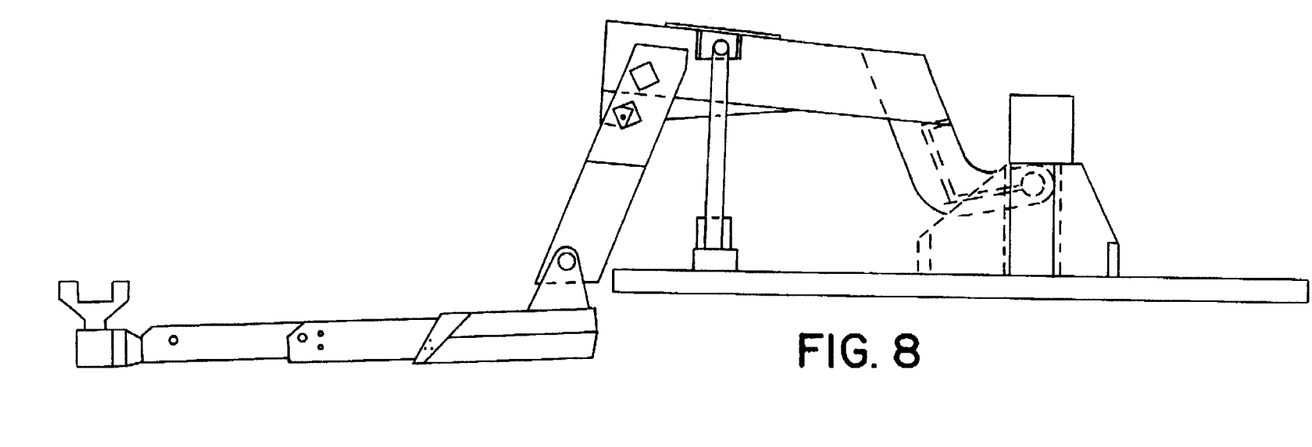
FIG. 8 is a side view of the underreach assembly in accordance with the preferred embodiment of this invention showing a pivot point in a higher position.
Figure 9:
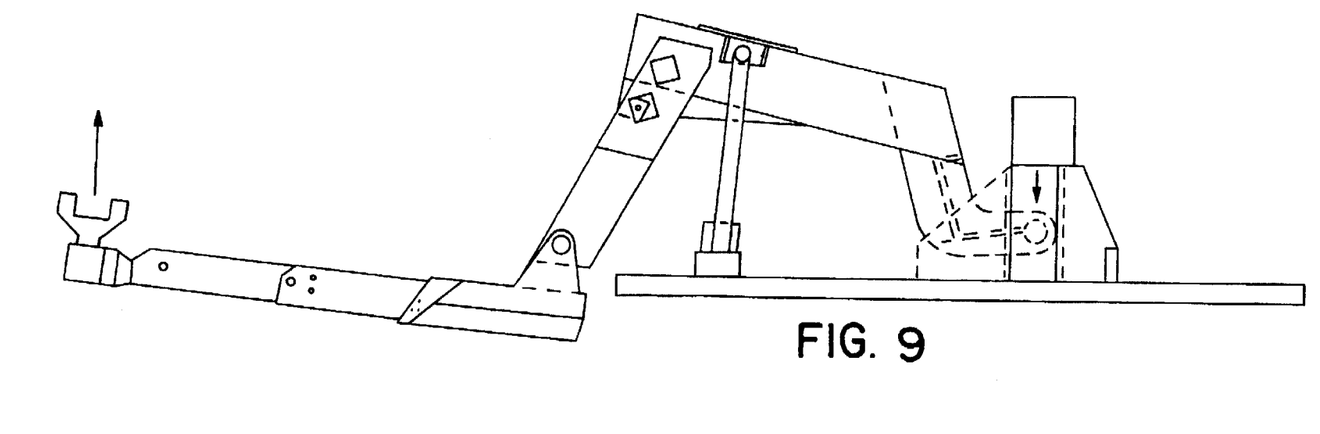
FIG. 9 is a side view of the underreach assembly in accordance with the preferred embodiment of this invention showing a pivot point in a lower position.

As shown in FIG. 6, a pair of connecting arms 72, which connect first horizontal member 58 to tilt cylinder assembly 56, extend inside the tilt cylinder assembly 56 and engage a rod 74 shown in FIG. 7.

As shown in FIG. 7, the tilt cylinder assembly 56 comprises a movable guide member inside a track. In the preferred embodiment the movable guide member includes a pair of rollers 76, which move up and down in a track 78 in order to raise and lower horizontal member 58. Suitable rollers having the desired strength and durability as those for "fork lift" trucks where, like this invention, rollers move primarily vertically along the track of the fork lift. Rollers 76 are connected to each end of the rod 74. Attached to rod 74 is a tilt cylinder assembly lifter 80 which operates to lift and lower the rod 74 up and down the track 78. At the center of rod 74 are the connecting arms 72 which are attached to the bottom of first horizontal member 58. As shown in FIG. 7, the connecting arms 72 are attached to the front end 66 of the first horizontal member 58, and the rod 74 goes through a hole in the connecting arms 72. The actuator 80 can be a hydraulic actuator or other lifting means know to those skilled in the art.

The lifters 70 are operated to lift the underreach assembly. Through the movement of the lifters 70 the underreach assembly is first raised vertically and then is raised further through the movement of the tilt cylinder assembly lifter 80. The tilt cylinder assembly lifter 80 causes the rod 74 to move downward. When the rod 74 is lowered, the rollers 76 move vertically downward in the tracks 78. As the rod 74 is lowered, the connecting arms 72 and the horizontal member 58 are pivoted about the first pivot point 84. Then, in this way, the movement of the underreach assembly is achieved in discrete movements resulting in a smaller arcuate motion from the prior art. Further, because the underreach assembly is raised by the forcing down of the front of first horizontal member 58, a single vertical actuator can be used. This reduces the amount of power used by the underreach in lifting a load.

Variations of the invention are possible. For example, the tracks or channels receiving the rollers or guide blocks may also define a curved or accurate path so as to enable a more vertical movement.

In yet another variation, electrical chain screw actuators may provide the vertical movement by having guide blocks engaged thereon.

In still another variation, slidable guide block within the tracks, without rollers, may be used to slide or move the underreach assembly up and down vertically.

This invention provides a number of significant advantages.

As yet another advantage, the movement of the second pivot point reduces the arc of the underreach assembly as it engages the underframe of the disabled vehicle so that proper engagement on sloped terrain is easier.

As yet another advantage, a single cylinder can be used to raise the rear end of the first horizontal member in conjunction with lifters on the front end of the first horizontal member to lift very heavy loads.

Of course, it should be understood, that a wide range of changes and modifications can be made to the preferred embodiments described above. It is therefore intended that

I claim:

1. An underreach assembly, for lifting and towing disabled vehicles, for attachment to a recovery vehicle chassis, said underreach assembly comprising:

an underreach boom base having a horizontal member attached at a back end to a vertical member, a first lifter and a second lifter each at an upper end rotatably attached to said horizontal member at a first pivot point, said first lifter and said second lifter at a lower end for attachment to the recovery vehicle chassis, a lifting boom attached at a first end to the vertical member, a second end of the lifting boom adapted to engage said disabled vehicle to be towed, said lifting boom slidably extendable from said first end of said vertical member to under said disabled vehicle, a front end of the horizontal member attached to a pair of connecting arms pivotably attached to a tilt cylinder assembly at a second pivot point located at distal end of the tilt cylinder, said tilt cylinder assembly including at least one lifter for moving the second pivot point, and said tilt cylinder assembly having base end opposite said distal end attached to the recovery vehicle chassis.

2. The underreach assembly according to claim 1 further comprising:

the tilt cylinder assembly further including a track for guiding the motion of the second pivot point; the at least one lifter structured to move the second pivot point along said track.

3. The underreach assembly of claim 2 wherein:

said motion of the second pivot point is in a vertical direction.

4. The underreach assembly of claim 2, wherein:

said track comprises a channel shaped track.

5. The underreach assembly of claim 2 wherein:

said track defines a curved surface.

6. The underreach assembly of claim 2, wherein:

said tilt assembly further includes a guide member attached to said second pivot point having at least one roller.

7. The underreach assembly of claim 6, wherein:

said guide member including two rollers.

8. An underreach assembly, for attachment to a recovery vehicle subframe, comprising:

an underreach boom base having a horizontal member attached at a back end to a vertical member, a first lifter and a second lifter each at an upper end rotatably attached to said horizontal member at a first pivot point, said first lifter and said second lifter at a lower end for attachment to the recovery vehicle subframe, a lifting boom attached at a first end to the vertical member, a second end of the lifting boom adapted to engage a disabled vehicle to be towed, said lifting boom slidably extendable from said first end of said vertical member to under said disabled vehicle, a front end of the horizontal member attached to a pair of connecting arms pivotably attached to a tilt cylinder assembly at a second pivot point located at distal end of the tilt cylinder, said tilt cylinder assembly including at least one lifter for moving the second pivot point, and said tilt cylinder assembly having base end opposite said distal end attached to the recovery vehicle subframe.

9. The underreach assembly according to claim 8 further comprising:

the tilt cylinder assembly further including a track for guiding the motion of the second pivot point; the at least one lifter structured to move the second pivot point along said track.

10. The underreach assembly of claim 9 wherein:

said motion of the second pivot point is in a vertical direction.

11. The underreach assembly of claim 9, wherein:

said track comprises a channel shaped track.

12. The underreach assembly of claim 9 wherein:

said track defines a curved surface.

13. The underreach assembly of claim 9, wherein:

said tilt assembly further includes a guide member attached to said second pivot point having rollers.

14. The underreach assembly of claim 13, wherein:

said guide member including two rollers.

15. A recovery vehicle for lifting a part of a disabled vehicle and towing the disabled vehicle comprising:

a recovery vehicle chassis; and an underreach assembly, attached to the recovery vehicle chassis, said underreach assembly includes, an underreach boom base having a horizontal member attached at a back end to a vertical member, a first lifter and a second lifter each at an upper end rotatably attached to said horizontal member at a first pivot point, said first lifter and said second lifter at a lower end for attachment to the recovery vehicle chassis, a lifting boom attached at a first end to the vertical member, a second end of the lifting boom adapted to engage said disabled vehicle to be towed, said lifting boom slidably extendable from said first end of said vertical member to under said disabled vehicle, a front end of the horizontal member attached to a pair of connecting arms pivotably attached to a tilt cylinder assembly at a second pivot point located at distal end of the tilt cylinder, said tilt cylinder assembly including at least one lifter for moving the second pivot point, and said tilt cylinder assembly having base end opposite said distal end attached to the recovery vehicle chassis.

16. The underreach assembly according to claim 15 further comprising:

the tilt cylinder assembly further including a track for guiding the motion of the second pivot point; the at least one lifter structured to move the second pivot point along said track.

17. The underreach assembly of claim 16 wherein:

said motion of the second pivot point is in a vertical direction.

18. The underreach assembly of claim 16, wherein:

said track comprises a channel shaped track.

19. The underreach assembly of claim 16 wherein:

said track defines a curved surface.

20. The underreach assembly of claim 16, wherein:

said tilt assembly further includes a guide member attached to said second pivot point having at least one roller.

21. The underreach assembly of claim 20, wherein:

said guide member including two rollers.

* * * * *